(12) United States Patent
Brandt et al.

(10) Patent No.: US 10,598,043 B2
(45) Date of Patent: Mar. 24, 2020

(54) TURBOCHARGER

(71) Applicant: MAN Energy Solutions SE, Augsburg (DE)

(72) Inventors: Sven Brandt, München (DE); Claudius Wurm, Augsburg (DE); Harald Denkel, Baar (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/191,713

(22) Filed: Nov. 15, 2018

(65) Prior Publication Data

US 2019/0145281 A1     May 16, 2019

(30) Foreign Application Priority Data

Nov. 16, 2017 (DE) .................. 10 2017 126 950

(51) Int. Cl.
  *F01D 25/16*      (2006.01)
  *F02C 6/12*       (2006.01)
  (Continued)

(52) U.S. Cl.
  CPC ......... *F01D 25/168* (2013.01); *F01D 25/166* (2013.01); *F01D 25/18* (2013.01);
  (Continued)

(58) Field of Classification Search
  CPC .......... F16C 17/02; F16C 17/18; F16C 17/26; F16C 27/02; F16C 25/02; F16C 2360/24;
  (Continued)

(56) References Cited

U.S. PATENT DOCUMENTS 4,640,630 A * 2/1987 Yoshioka .............. F01D 25/164
                                                    384/129
8,147,181 B2 * 4/2012 Gee ........................ F01D 25/183
                                                    415/111
(Continued)

FOREIGN PATENT DOCUMENTS

DE    102007036913 A1 * 12/2010 ............. F01D 5/027
DE    102013002605        8/2014
(Continued)

*Primary Examiner* — Marcus Charles
(74) *Attorney, Agent, or Firm* — Cozen O'Connor

(57) ABSTRACT

A turbocharger having a turbine with a turbine rotor, a compressor with a compressor rotor that is coupled to the turbine rotor via a shaft. A bearing housing arranged between the turbine housing and the compressor housing, wherein both the turbine housing and also the compressor housing are connected to the bearing housing, with at least one bearing, via which the shaft is mounted in the bearing housing, wherein the respective bearing includes a bearing bush that is mounted on the bearing housing in a rotationally fixed manner, wherein between the bearing bush and the bearing housing a radially outer lubricating cap and between the bearing bush and the shaft a radially inner lubricating gap is formed, and wherein axial ends of the respective bearing bush, at a radially outer section of the same have a greater axial extent than on a radially inner section of the same.

14 Claims, 3 Drawing Sheets

(51) Int. Cl.
  *F01D 25/18* (2006.01)
  *F16C 17/18* (2006.01)
  *F16C 27/02* (2006.01)

(52) U.S. Cl.
  CPC ............... *F02C 6/12* (2013.01); *F16C 17/18* (2013.01); *F16C 27/02* (2013.01); *F05D 2220/40* (2013.01); *F05D 2240/52* (2013.01); *F05D 2240/54* (2013.01); *F05D 2260/98* (2013.01); *F16C 2360/24* (2013.01)

(58) Field of Classification Search
  CPC .......... F01D 25/166; F01D 25/18; F02C 6/12; F05D 2240/52; F05D 2240/54; F05D 2260/98
  USPC ....... 384/129, 276, 287, 296, 322, 416, 901; 415/111, 229; 417/407
  See application file for complete search history.

(56) References Cited

U.S. PATENT DOCUMENTS

| | | | | |
|---|---|---|---|---|
| 8,790,066 | B2* | 7/2014 | Gutknecht | ............ F01D 25/16 |
| | | | | 415/1 |
| 9,638,059 | B2* | 5/2017 | Becker | ................ F01D 25/166 |
| 2016/0130967 | A1* | 5/2016 | Kelly | ............... F01D 11/003 |
| | | | | 415/174.5 |
| 2017/0260861 | A1* | 9/2017 | Yoshida | .................... F01D 5/04 |

FOREIGN PATENT DOCUMENTS

| | | | | | |
|---|---|---|---|---|---|
| WO | WO 2012058110 | A2 * | 5/2012 | ............ | F01D 25/164 |
| WO | WO-2012058110 | A2 * | 5/2012 | ............ | F01D 25/16 |
| WO | WO-2012132586 | A1 * | 10/2012 | ............ | F16C 17/18 |
| WO | WO-2013002142 | A1 * | 1/2013 | ............ | F02M 55/00 |
| WO | WO-2013180959 | A1 * | 12/2013 | ............ | F01D 11/003 |
| WO | WO-2017042925 | A1 * | 3/2017 | ............ | F16C 17/00 |

* cited by examiner

TURBOCHARGER

1. FIELD OF THE INVENTION

The invention relates to a turbocharger and particularly to the bearing bush thereof.

2. BACKGROUND OF THE INVENTION

From DE 10 2013 002 605 A1, the content of which is hereby incorporated herein in its entirety, the fundamental construction of a turbocharger is known. A turbocharger comprises a turbine in which a first medium is expanded. A turbocharger, furthermore, comprises a compressor in which a second medium is compressed, namely utilising the energy extracted in the turbine during the expansion of the first medium. The turbine of the turbocharger comprises a turbine housing and a turbine rotor. The compressor of the turbocharger comprises a compressor housing and a compressor rotor. Between the turbine housing of the turbine and the compressor housing of the compressor, a bearing housing is positioned, wherein the bearing housing on the one hand is connected to the turbine housing and on the other hand to the compressor housing. In the bearing housing, a shaft is mounted via which the turbine rotor is coupled to the compressor rotor.

From practice it is known that the shaft which couples the turbine rotor of the turbine to the compressor rotor of the compressor is mounted in the bearing housing via at least one bearing. The respective bearing of the bearing housing for mounting the shaft comprises a bearing bush, which can either be mounted in a rotationally fixed manner or rotate in the bearing housing. The present invention relates to a turbocharger, in the case of which in the region of at least one bearing of the bearing housing, the bearing bush of the bearing is mounted in the bearing housing in a rotationally fixed manner. Between the bearing housing and the bearing bush a radially outer lubricating gap and between the bearing bush and the shaft a radially inner lubricating gap are formed. The radially outer lubricating gap formed between the bearing housing and the bearing bush is also referred to as squeeze film dampers.

In turbochargers known from practice, the respective bearing of the bearing housing is fixed in its axial position in the bearing housing because of the fact that the respective bearing bush, with a first axial end, interacts with a stop provided by the bearing housing, and because of the fact that the axial end of the bearing bush located opposite interacts with a cover. The axial end faces of the bearing bush, which are formed at the axial ends of the bearing bush and are located opposite either the stop of the bearing housing or the cover, are formed in turbochargers known from practice in such a manner that the same extend perpendicularly relative to the axial direction of the bearing bush throughout. Accordingly, the respective bearing bush via its axial end faces comes to lie in each case with the full surface area against the shoulder of the bearing housing and the cover. In order to avoid excessive friction between the axial end faces of the bearing bush and the stop of the bearing housing or the cover, a defined axial gap is adjusted between the axial end faces of the bearing bush and the stop of the bearing housing as well as the cover, which however results in oil losses in particular in the region of the radially outer lubricating gap functioning as squeeze film damper.

SUMMARY OF THE INVENTION

According to the present invention, axial ends of the respective bearing bush have a greater axial extent on a radially outer section of the same than on a radially inner section of the same. With the invention, the axial play for the bearing bush of the respective bearing of the bearing housing of the turbocharger can be reduced without the risk of excessive friction between the axial end faces of the bearing bush and the bearing housing or cover. Because of the fact that the axial ends of the respective bearing bush have a greater axial extent radially outside than radially inside, a very small axial gap can be adjusted between bearing bush and bearing housing or cover. Oil losses can be reduced. The outer lubricating gap functioning as squeeze film damper can optimally provide its squeeze film damper function.

According to an advantageous further development, at least one of the axial ends of the respective bearing bush lies against the bearing housing or the cover merely with the respective radially outer section. In this region, a very small axial gap is adjusted between bearing bush and bearing housing or cover, as a result of which oil losses can be reduced. Preferentially, a first axial end of the respective bearing bush lies against the bearing housing merely with a radially outer section, wherein a second end of the respective bearing bush lies against the cover merely with a radially outer section. These features serve for ensuring a minimum axial play with respect to the axial position of the respective bearing bush in the bearing housing while avoiding excessive friction and reducing oil losses.

According to an advantageous further development of the invention, a groove is formed at the axial end of the respective bearing bush, which adjoins the cover, in which a projection of the cover forming an anti-rotation device engages, wherein the groove ends radially spaced from the radially outer face of the bearing bush and from the radially outer section of the axial end. By way of this, an anti-rotation device for the bearing bush can be provided without the risk of oil losses for the radially outer lubricating gap.

On end faces, the axial ends of the respective bearing bush are sloped funnel-like to radially inside or the same are contoured step-like to radially inside. These contourings of the axial ends or axial end faces of the bearing bush are particularly preferred in order to ensure that axial ends of the respective bearing bush at a radially outer section of the same have a greater axial extent than on a radially inner section of the same, and that in particular the bearing bush comes to lie against the bearing housing and the cover merely with radially outer sections.

BRIEF DESCRIPTION OF THE DRAWINGS

Exemplary embodiments of the invention are explained in more detail by way of the drawing in which.

DETAILED DESCRIPTION OF THE PRESENTLY PREFERRED EMBODIMENTS

Figure 1:
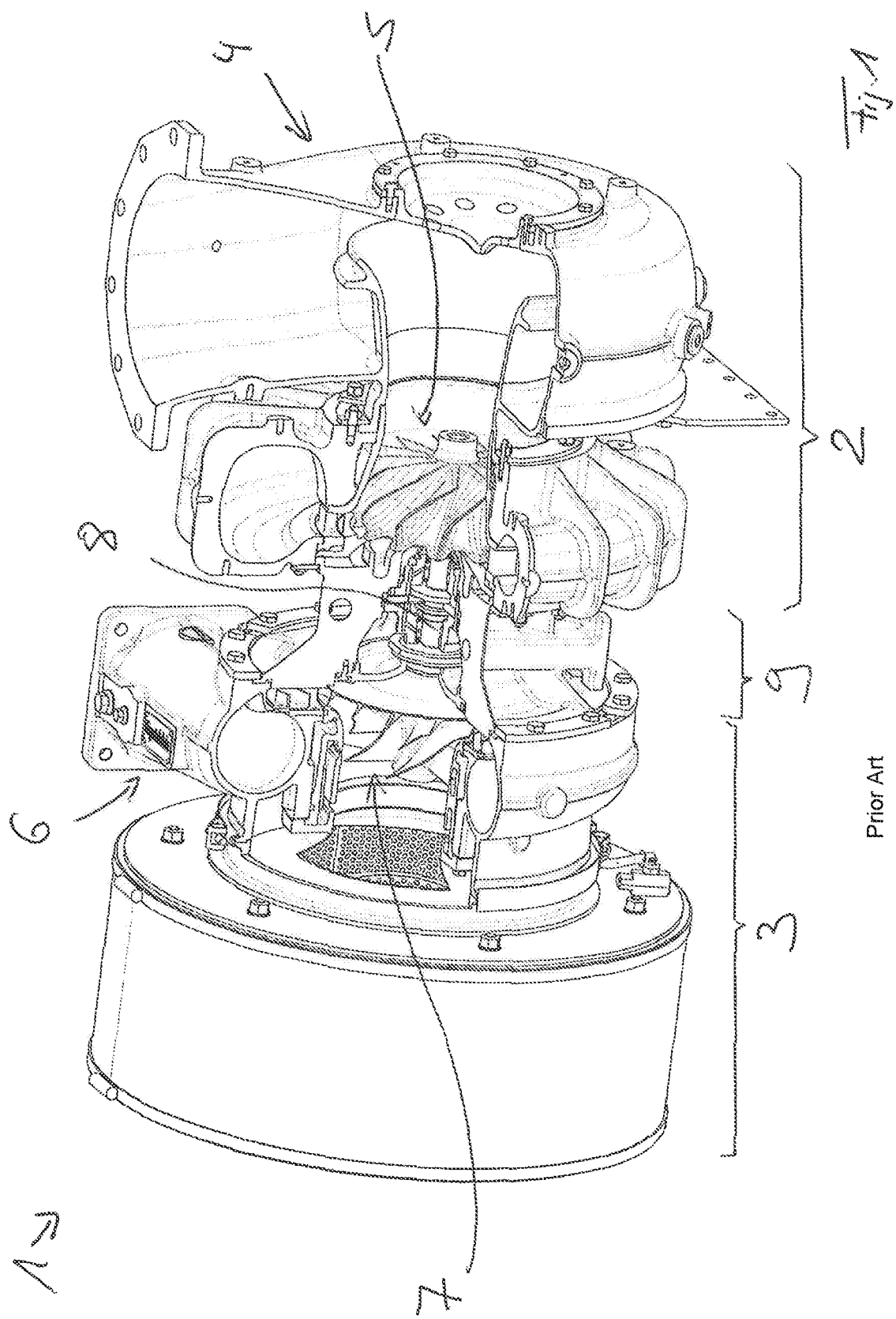
FIG. 1 is a cross sectional view through a turbocharger according to the prior art.

A turbocharger 1 comprises a turbine 2 for expanding a first medium, in particular for expanding exhaust gas of an internal combustion engine. Furthermore, a turbocharger 1 comprises a compressor 3 for compressing a second medium, in particular charge air, namely utilising energy extracted in the turbine 2 during the expansion of the first medium. The turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8 which is mounted in a bearing housing 9, wherein the bearing housing 9 is positioned between the turbine housing 4 and the compressor housing 6 and connected to both the turbine housing 4 and the compressor housing 6.

The shaft 8, which couples the turbine rotor 5 of the turbine 2 to the compressor rotor 7 of the compressor 3, is mounted in the bearing housing 9, namely via at least one bearing 10 of the bearing housing 9. Preferentially, the bearing housing 9 comprises two bearings 10 for mounting the shaft 8, wherein a first bearing 10 acts on a section of the shaft 8 facing the turbine rotor 5, and wherein a second bearing 10 sits on an end of the shaft 8 facing the compressor rotor 7.

The respective bearing 10 comprises a bearing bush 11, which is mounted in a rotationally fixed manner in the bearing housing 9, in particular in a bearing body of the bearing housing 9. Such a bearing bush 11 mounted in the bearing housing 9 in a rotationally fixed manner or mounted on the bearing housing 9 in a rotationally fixed manner, is a housing-side, stator-side assembly which is stationary with rotating shaft 8.

Between the bearing bush 11 that is mounted in the bearing housing 9 in a rotationally fixed manner and the bearing housing 9 a radially outer lubricating gap 13 and between the bearing bush 11 and the shaft 8 a radially inner lubricating gap 14 is formed. The radially outer lubricating gap 13 formed between the bearing housing 9 and the bearing bush 11 functions as squeeze film damper.

The bearing bush 11 is inserted into a recess in the bearing housing 9 and with an axial end adjoins a stop formed by the bearing housing 9. At the axial end of the bearing bush 11 located opposite, a cover 12 is positioned which together with the bearing housing 9 provides the axial positioning of the bearing bush 11 in the bearing housing 9.

According to the present invention it is provided that axial ends of the respective bearing bush 11, on a radially outer section 18, 19 of the same, have a greater axial extent than on a radially inner section 24, 25 of the same.

On both axial ends located opposite, the bearing bush 11, lies against the bearing housing 9 with its axial end faces 16, 17, merely with the radially outer section 18 and 19 respectively, namely against the shoulder 15 of the bearing housing 9, and against the cover 12, however not with the radially inner section 24, 25.

In the region of the axial ends of end faces 16, 17 of the bearing bush 11, a minimal axial play is provided between the bearing bush 11 and the bearing housing 9 as well as cover 12, without the risk of excessive friction between bearing bush 11 and cover as well as between bearing bush 11 and bearing housing 9, wherein through this minimal axial gap oil losses in the region of the radially outer lubricating gap 13 serving as squeeze film damper are avoided.

According to the shown preferred exemplary embodiments, the bearing bush 11 at a first axial end with the corresponding first axial end face 16 in the region of the radially outer section 18 lies against the protrusion 21 of the bearing housing 9, on the axial end located opposite or the axial end face 17 of the bearing bush 11 located opposite, the same lies against the cover 12 with the radially outer section 19.

It is also possible that the radially outer section 18 does not lie against the protrusion 21 of the bearing housing 9 and/or the radially outer section 19 does not lie against the cover 12. In this case, an axial play is then formed on at least one of the axial ends of the respective bearing bush 11 between the respective radially outer section 18, 19 and the bearing housing 9 and/or the cover 12, which is smaller than the axial play in the region of the respective radially inner section 24, 25 of the respective axial end of the respective bearing bush 11.

Figure 3:
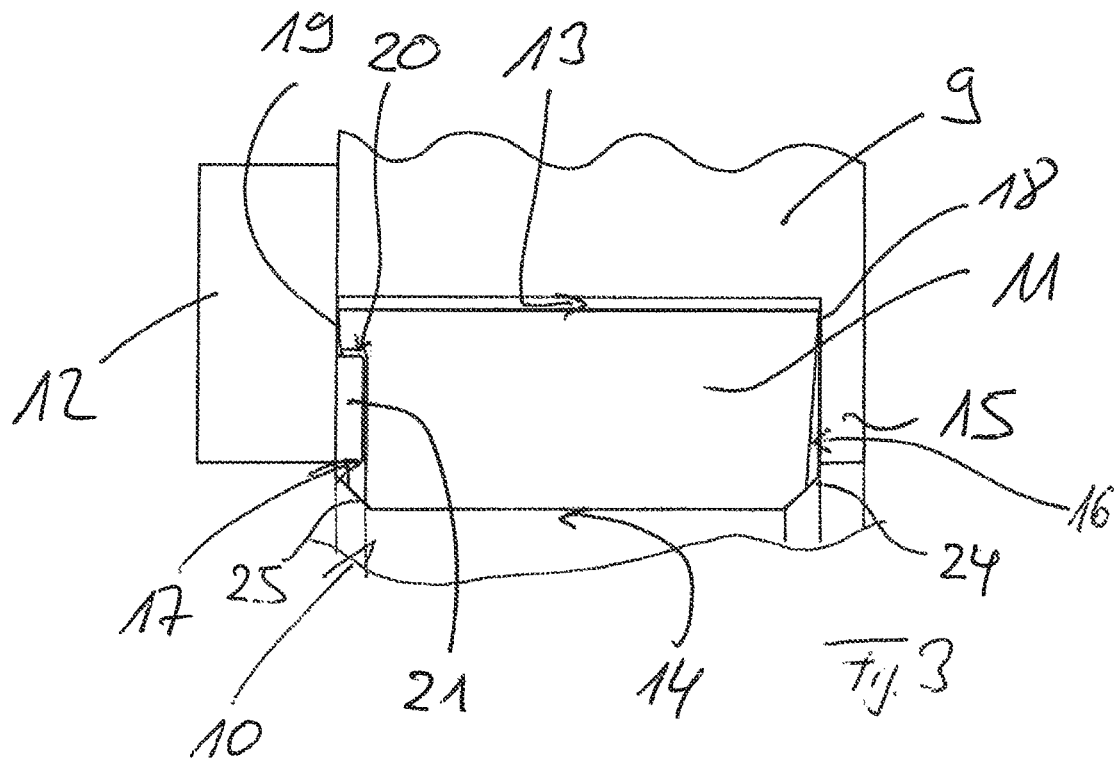
FIG. 3 shows a detail of a first turbocharger according to the invention in the region of a bearing of the bearing housing.
Figure 4:
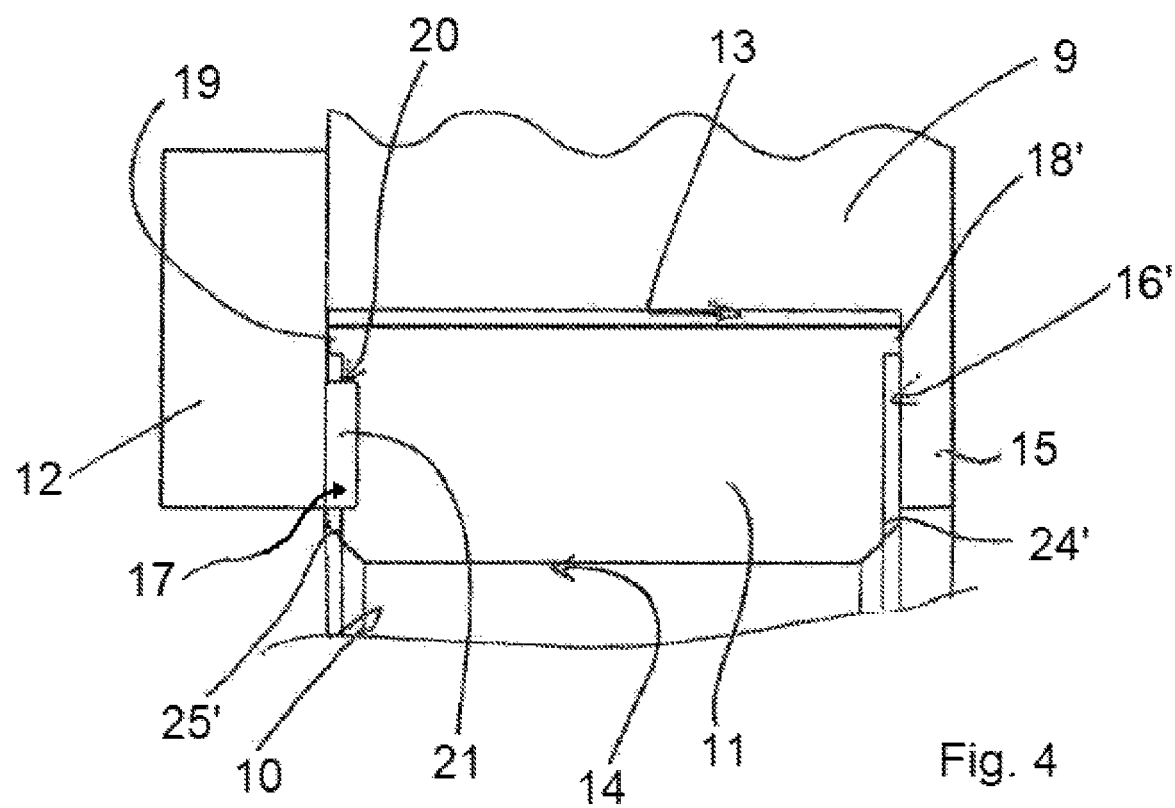
FIG. 4 shows a detail of a second turbocharger according to the invention in the region of a bearing of the bearing housing.
Figure 5:
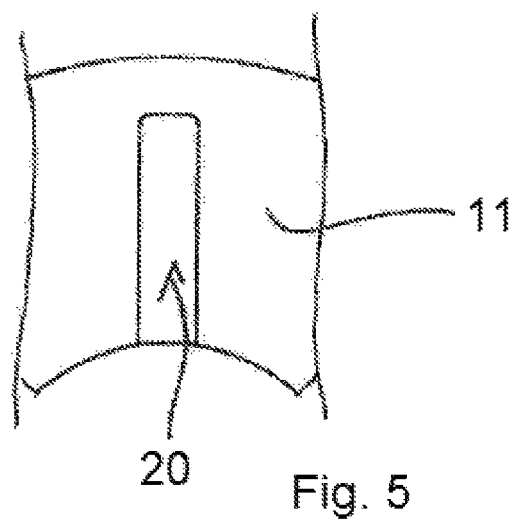
FIG. 5 is a lateral view of the detail of FIG. 4.

In the exemplary embodiment of FIG. 3, the bearing bush 11 is sloped in the region of its axial end faces 16, 17 funnel-like to radially inside, in the exemplary embodiment of FIG. 4 the axial end faces 16', 17 of the bearing bush 11 are contoured step-like to radially inside, so that accordingly in both exemplary embodiments the bearing bush 11 comes to lie against the shoulder 15 of the bearing housing 9 as well as against the cover 12 merely with its radially outer sections 18', 18, 19. FIG. 4 also shows the respective radially inner section 24', 25' of the respective axial end of the respective bearing bush 11.

In the shown exemplary embodiments, a groove 20 is formed on that axial end of the bearing bush 11 or on that axial end face 17 which is located opposite the cover 12 or adjoins the cover 12, in which, forming an anti-rotation device, a protrusion 21 of the cover 12 engages. This groove 20 ends radially spaced from the radially outer face of the bearing bush 11 or radially spaced from the radially outer section 19 of the end face 17, which in the shown exemplary embodiments comes to lie against the cover 12. The radial spacing between the radially outer end of the groove 20 and the radially outer face of the bearing bush 11 is consequently dimensioned in such a manner that the groove 20 ends spaced from the radially outer section 19 of the axial end of the bearing bush 11, with which in the shown exemplary embodiments the bearing bush 11 lies against the cover 12.

Expressed in other words, the groove 20 does not extend into the radially outer section 19 of the axial end face 17 of the bearing bush 11, with which in the shown exemplary embodiments the bearing bush 11 lies against the cover 12.

Figure 2:
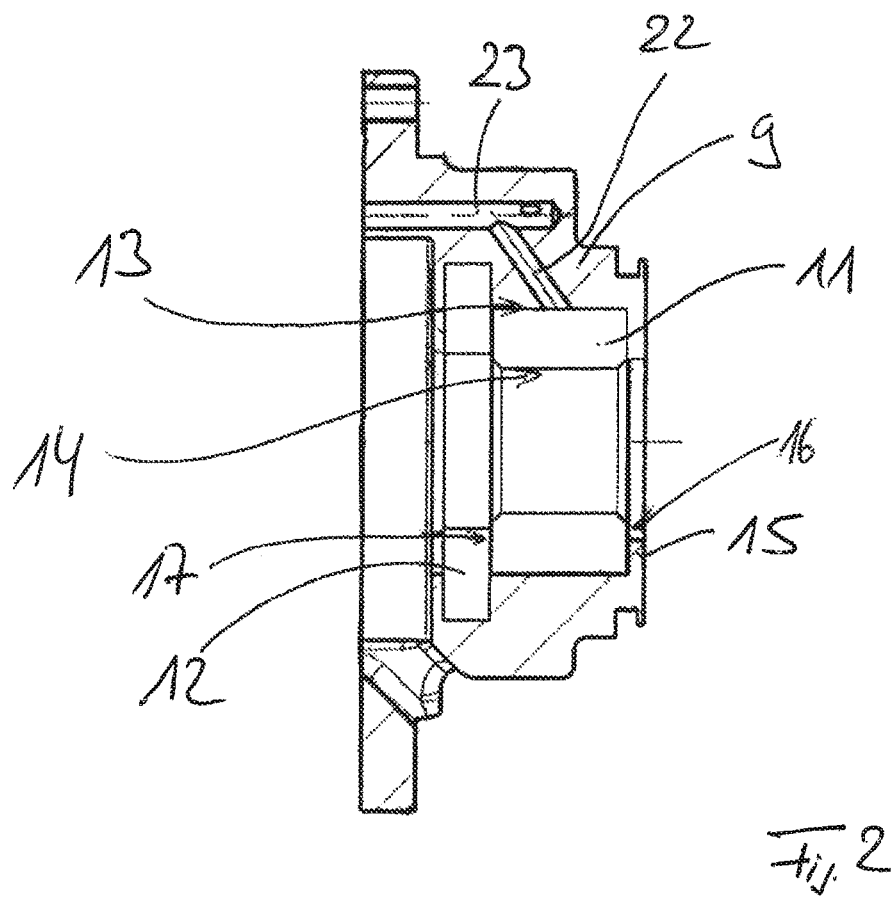
FIG. 2 is a cross sectional view through a turbocharger of the present invention in the region of a bearing of the bearing housing.

The radially outer lubricating gap 13 functioning as squeeze film damper between the bearing bush 11 and the bearing housing 9 is supplied with lubricating oil via at least one line 22 emanating from an oil supply main line 23 of the bearing housing 9 (see FIG. 2), wherein the or each line 22, which emanating from the oil supply main line 23 supplies the radially outer lubricating gap 13 with oil, radially outside opens into the radially outer lubricating gap 13.

By way of lines which are not shown, which extend through the bearing bush 11 in the radial direction, the radially inner lubricating gap 14 can also be supplied with lubricating oil emanating from the radially outer lubricating gap 13.

Accordingly, with the invention, modified configurations or contourings of the axial end faces 16, 17 of the bearing bush 11, which are also referred to as bearing bush flanks, are proposed in order to reduce the axial play between bearing bush 11, bearing housing 9 and cover 12. Here, the axial end faces 16, 17 of the bearing bush 11 are configured or contoured in such a manner that axial ends of the bearing bush 11 on the radially outer section 18, 19 of the same have a greater axial extent than on the radially inner section 24, 25 of the same. Here, the axial end faces 16, 17 of the bearing bush 11 can be configured or contoured in such a manner that the bearing bush 11 via its axial ends merely lies with radially outer sections 18, 19 against the bearing housing 9 and the cover 12. Friction in the region of the bearing bush 11 is reduced, oil losses via the axial gap between bearing bush 11 and bearing housing 9 and the axial gap between bearing bush 11 and cover 12 are additionally reduced. The radially outer lubricating gap 13 can optimally provide its function as lubricating film damper.

According to a particularly preferred further development, a new type of anti-rotation device for the bearing bush 11 is proposed, furthermore, namely by the interaction of the groove 20 introduced into the axial end face 17 of the bearing bush 11 and of the protrusion 21 of the cover 12, wherein this groove 20 does not extend into the region or not into the radially outer section 19 of the bearing bush 11, with which in the shown exemplary embodiment the bearing bush 11 comes to lie against the cover 12. Accordingly, the anti-rotation device does not negatively affect the damping action of the radially outer lubricating gap or of the squeeze film damper and does not negatively affect the reduction of the axial play between bearing bush 11 and bearing housing 9 as well as cover 12.

In the region of the radially outer sections 18, 19 of the bearing bush 11, with which the bearing bush 11 comes to lie against the protrusion 15 of the bearing housing 9 as well as the cover 12, a so-called running-in wear of the end faces 16, 17 of the bearing bush 11 can be optimally adjusted.

The invention can be employed with any type of turbocharger. The invention is independent of the concrete embodiment of the turbine as well as the compressor. The invention is also independent of the concrete embodiment of an internal combustion engine interacting with the turbocharger.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbocharger comprising:
   a turbine for expanding a first medium, the turbine comprising a turbine housing and a turbine rotor,
   a compressor for compressing a second medium utilizing energy extracted in the turbine during the expansion of the first medium, the compressor comprising a compressor housing and a compressor rotor coupled to the turbine rotor via a shaft,
   a bearing housing arranged between the turbine housing and the compressor housing, both the turbine housing and the compressor housing connected to the bearing housing,
   at least one bearing for mounting the shaft in the bearing housing, the at least one bearing comprising a bearing bush mounted in the bearing housing in a rotationally fixed manner, wherein between the bearing bush and the bearing housing a radially outer lubricating gap and between the bearing bush and the shaft a radially inner lubricating gap is formed, and
   wherein both axial ends of the bearing bush on a radially outer section of the bearing bush, have a greater axial extent than on a respective radially inner section of the bearing bush.

2. The turbocharger according to claim 1, wherein at least one of the axial ends of the bearing bush lies against the bearing housing or against a cover only with the radially outer section.

3. The turbocharger according to claim 2, wherein a first axial end of the bearing bush lies against the bearing housing only with the radially outer section, and/or a second axial end of the bearing bush lies against the cover only with the radially outer section.

4. The turbocharger according to claim 2, further comprising an axial play on at least one of the axial ends of the bearing bush between the radially outer section and the bearing housing or on the cover.

5. The turbocharger according to claim 2, further comprising an axial play on at least one of the axial ends of the bearing bush between the radially outer section and the bearing housing or on the cover.

6. The turbocharger according to claim 1, wherein a first axial end of the bearing bush lies against the bearing housing only with the radially outer section, and/or
   a second axial end of the bearing bush lies against the cover only with the radially outer section.

7. The turbocharger according to claim 1, further comprising an axial play on at least one of the axial ends of the bearing bush between the radially outer section and the bearing housing or on a cover.

8. The turbocharger according to claim 1, wherein the axial ends of the bearing bush comprise end faces and wherein the axial ends of the bearing bush are sloped on the end faces funnel-like to radially inside.

9. The turbocharger according to claim 1, wherein the bearing bush comprises axial ends having axial end faces and wherein the axial ends of the bearing bush are contoured step-like on the end faces radially to the inside.

10. A turbocharger comprising:
    a turbine for expanding a first medium, the turbine comprising a turbine housing and a turbine rotor,
    a compressor for compressing a second medium utilizing energy extracted in the turbine during the expansion of the first medium, the compressor comprising a compressor housing and a compressor rotor coupled to the turbine rotor via a shaft,
    a bearing housing arranged between the turbine housing and the compressor housing, both the turbine housing and the compressor housing connected to the bearing housing,
    at least one bearing for mounting the shaft in the bearing housing, the at least one bearing comprising a bearing bush mounted in the bearing housing in a rotationally fixed manner, wherein between the bearing bush and the bearing housing a radially outer lubricating gap and between the bearing bush and the shaft a radially inner lubricating gap is formed, and wherein
    axial ends of the bearing bush on a radially outer section of the bearing bush, have a greater axial extent than on a radially inner section of the bearing bush,
    wherein at least one of the axial ends of the bearing bush lies against the bearing housing or against a cover, and wherein the bearing bush comprises a groove on the axial end of the bearing bush, which adjoins the cover, and wherein the cover comprises a protrusion, the protrusion engaging into the groove for forming an anti-rotation device.

11. The turbocharger according to claim 10, wherein the groove ends radially spaced from a radially outer face of the bearing bush.

12. The turbocharger according to claim 11, wherein the radial spacing between an end of the groove and the radially outer face of the bearing bush is dimensioned so that the groove ends spaced from a radially outer section of the axial end of the bearing bush, which adjoins the cover.

13. The turbocharger according to claim 12, wherein the radial spacing between the end of the groove and the radially outer face of the bearing bush is dimensioned so that the groove does not extend into the radially outer section of the axial end of the bearing bush, which adjoins the cover.

14. The turbocharger according to claim 11, wherein the radial spacing between the end of the groove and the radially outer face of the bearing bush is dimensioned so that the groove does not extend into the radially outer section of the axial end of the bearing bush which adjoins the cover.

* * * * *